US009418318B2

(12) United States Patent
Nadar et al.

(10) Patent No.: US 9,418,318 B2
(45) Date of Patent: Aug. 16, 2016

(54) ROBUST SUBSPACE RECOVERY VIA DUAL SPARSITY PURSUIT

(71) Applicants: Siemens Aktiengesellschaft, Munich (DE); North Carolina State University, Raleigh, NC (US)

(72) Inventors: Mariappan S. Nadar, Plainsboro, NJ (US); Xiao Bian, Raleigh, NC (US); Qiu Wang, Princeton, NJ (US); Hasan Ertan Cetingul, Cranbury, NJ (US); Hamid Krim, Raleigh, NC (US); Lucas Plaetevoet, Lynde (FR)

(73) Assignees: Siemens Aktiengesellschaft, Munich (DE); North Carolina State University, Raleigh, NC (US)

( * ) Notice: Subject to any disclaimer, the term of this patent is extended or adjusted under 35 U.S.C. 154(b) by 18 days.

(21) Appl. No.: 14/468,725

(22) Filed: Aug. 26, 2014

(65) Prior Publication Data
US 2015/0063687 A1 Mar. 5, 2015

Related U.S. Application Data

(60) Provisional application No. 61/871,973, filed on Aug. 30, 2013.

(51) Int. Cl.
G06K 9/00 (2006.01)
G06K 9/64 (2006.01)
G06T 7/00 (2006.01)

(52) U.S. Cl.
CPC ............. G06K 9/645 (2013.01); G06T 7/0081 (2013.01); G06T 2207/20144 (2013.01); G06T 2207/30048 (2013.01); G06T 2207/30104 (2013.01)

(58) Field of Classification Search
None
See application file for complete search history.

(56) References Cited

U.S. PATENT DOCUMENTS

| | | | | | |
|---|---|---|---|---|---|
| 7,336,803 | B2 * | 2/2008 | Mittal | ................ | G06K 9/00771 348/169 |
| 7,916,944 | B2 * | 3/2011 | Yang | ..................... | G06T 7/0083 348/143 |
| 8,872,928 | B2 * | 10/2014 | Jin | .......................... | G06T 7/206 348/208.4 |
| 8,935,308 | B2 * | 1/2015 | Porikli | ................. | G06K 9/6249 708/207 |
| 8,989,442 | B2 * | 3/2015 | Mei | .................... | G06K 9/00771 382/103 |

OTHER PUBLICATIONS

Cui, et al. "Background Subtraction Using Low Rank and group Sparsity Constraints", 2012, Springer, pp. 613-625.*
Chen, et al. "Surveillance Video Coding via Low-Rank and Sparse Decomposition", 2012, ACM pp. 1-4.*

* cited by examiner

Primary Examiner — Daniel Mariam
(74) Attorney, Agent, or Firm — Peter Kendall

(57) ABSTRACT

A computer-implemented method of detecting a foreground data in an image sequence using a dual sparse model framework includes creating an image matrix based on a continuous image sequence and initializing three matrices: a background matrix, a foreground matrix, and a coefficient matrix. Next, a subspace recovery process is performed over multiple iterations. This process includes updating the background matrix based on the image matrix and the foreground matrix; minimizing an L−1 norm of the coefficient matrix using a first linearized soft-thresholding process; and minimizing an L−1 norm of the foreground matrix using a second linearized soft-thresholding process. Then, background images and foreground images are generated based on the background and foreground matrices, respectively.

18 Claims, 10 Drawing Sheets

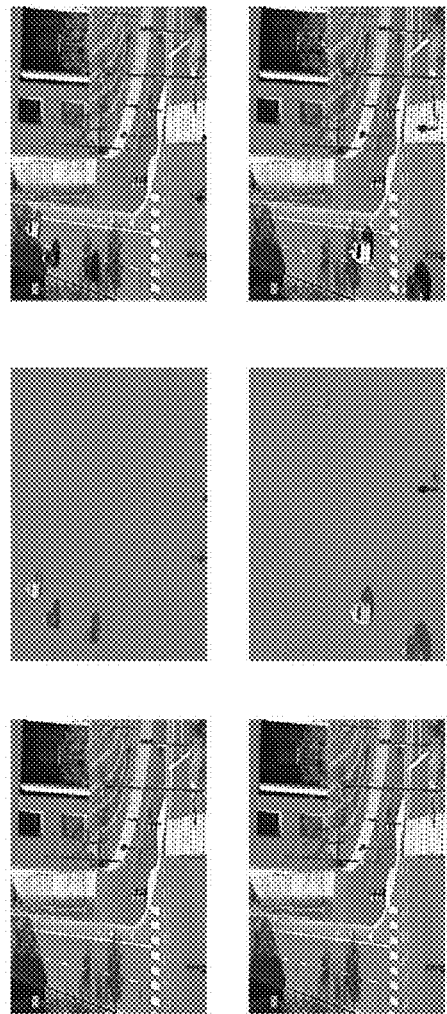
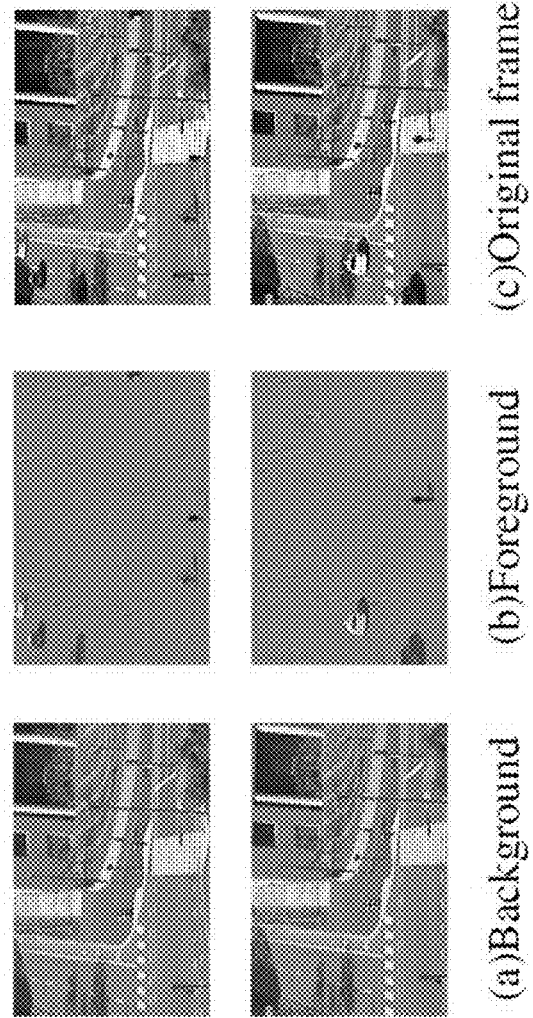
Fig. 7A
Fig. 7B

ROBUST SUBSPACE RECOVERY VIA DUAL SPARSITY PURSUIT

CROSS-REFERENCE TO RELATED APPLICATIONS

This application claims priority to U.S. Provisional Application Ser. No. 61/871,973 filed Aug. 30, 2013 which is incorporated herein by reference in its entirety.

TECHNICAL FIELD

The present invention relates generally to methods, systems, and apparatuses for integrating a method for segmenting image data by recovering a union of low-dimensional subspaces in presence of sparse corruptions. The disclosed methods, systems, and apparatuses may be applied to, for example, computer vision problems such as video background subtraction, intensity variation segmentation on medical images, and face clustering.

BACKGROUND

Separating data from errors and noise has always been a critical and important problem in signal processing, computer vision and data mining. Robust principal component pursuit is particularly successful in recovering low dimensional structures of high dimensional data from arbitrary sparse outliers. However, successful applications of sparse models in computer vision and machine learning have increasingly hinted at a more general model, namely that the underlying structure of high dimensional data looks more like a union of subspaces (UoS) rather than a single low dimensional subspace. Therefore, it is desired to extend such techniques to high dimensional data modeling where the union of subspaces is further impacted by outliers and errors. This problem is intrinsically difficult, since the underlying subspace structure may be corrupted by unknown errors which, in turn, may lead to unreliable measurement of distance among data samples and cause data to deviate from the original subspaces.

SUMMARY

Embodiments of the present invention address and overcome one or more of the above shortcomings and drawbacks, by providing methods, systems, and apparatuses that utilize a dual sparse model as a framework to recover underlying subspaces of data samples from measured data corrupted by general sparse errors. The problem is formulated as a non-convex optimization problem and a sufficient condition of exact recovery is demonstrated. In addition, in some embodiments, an algorithm referred to as Subspace Recovery via Dual Sparsity Pursuit (RoSure-DSP) is used to approximate the global solution of the optimization problem. This technology is particularly well-suited for, but not limited to, computer vision problems such as video background subtraction, intensity variation segmentation on medical images, and face clustering.

According to one embodiment of the present invention, a computer-implemented method of detecting a foreground data in an image sequence using a dual sparse model framework includes creating an image matrix based on a continuous image sequence and initializing three matrices: a background matrix, a foreground matrix, and a coefficient matrix. Next, a subspace recovery process is performed. This process includes updating the background matrix based on the image matrix and the foreground matrix; minimizing an L−1 norm of the coefficient matrix using a first linearized soft-thresholding process; and minimizing an L−1 norm of the foreground matrix using a second linearized soft-thresholding process. The subspace recovery process is performed over multiple iterations (e.g., until convergence of one or more of the background matrix, the foreground matrix, and the coefficient matrix). Then, background images and foreground images are generated based on the background and foreground matrix, respectively.

In some embodiments, an image sequence may be generated based on the background images and/or the foreground images. For example, in medical applications, a background image sequence may be generated depicting a lymphatic system (or a blood vessel) and a foreground image sequence may be generated showing passage of fluid through the lymphatic system (or the blood vessel) to an organ or tissue. The foreground image sequence may then be used to generate a measurement of intensity variation.

The aforementioned method can be enhanced with additional features in some embodiments. For example, the subspace recovery process may utilize one or more tuning parameters such as Lagrange multiplier values. These tuning parameters may be applied, for example, by the first linearized soft-thresholding process and the second linearized soft-thresholding process discussed above. The subspace recovery process may then update these tuning parameters during each iteration.

According to another aspect of the present invention, a computer-implemented method of performing intensity variation segmentation using a dual sparse model framework includes receiving a myocardial perfusion image sequence comprising a plurality of images depicting fluid passing through a cardiac structure over time. An image matrix is created based on a continuous image sequence and three other matrices are initialized: a background matrix, a foreground matrix, and a coefficient matrix. Then, a subspace recovery process is performed over a plurality of iterations. In one embodiment, the subspace recovery process includes updating the background matrix based on the image matrix and the foreground matrix, minimizing an L−1 norm of the coefficient matrix using a first linearized soft-thresholding process; and minimizing an L−1 norm of the foreground matrix using a second linearized soft-thresholding process. Additionally, as with the other method discussed above, the subspace recovery process may utilize one or more tuning parameters such as Lagrange multiplier values. Then, the foreground matrix may be used to generate a measurement of intensity variation across the myocardial perfusion image sequence. In some embodiments, the background matrix is used to generate a sequence of images depicting motion of the cardiac structure over time.

Any of the methods discussed above can also be performed as part of a system, apparatus, or article of manufacture. Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures:

FIG. 7A shows a segmentation results in a video background subtraction application with a static background, according to some embodiments of the present invention;

FIG. 7B shows a segmentation results in a video background subtraction application with a moving background, according to some embodiments of the present invention;

DETAILED DESCRIPTION

Figure 1:
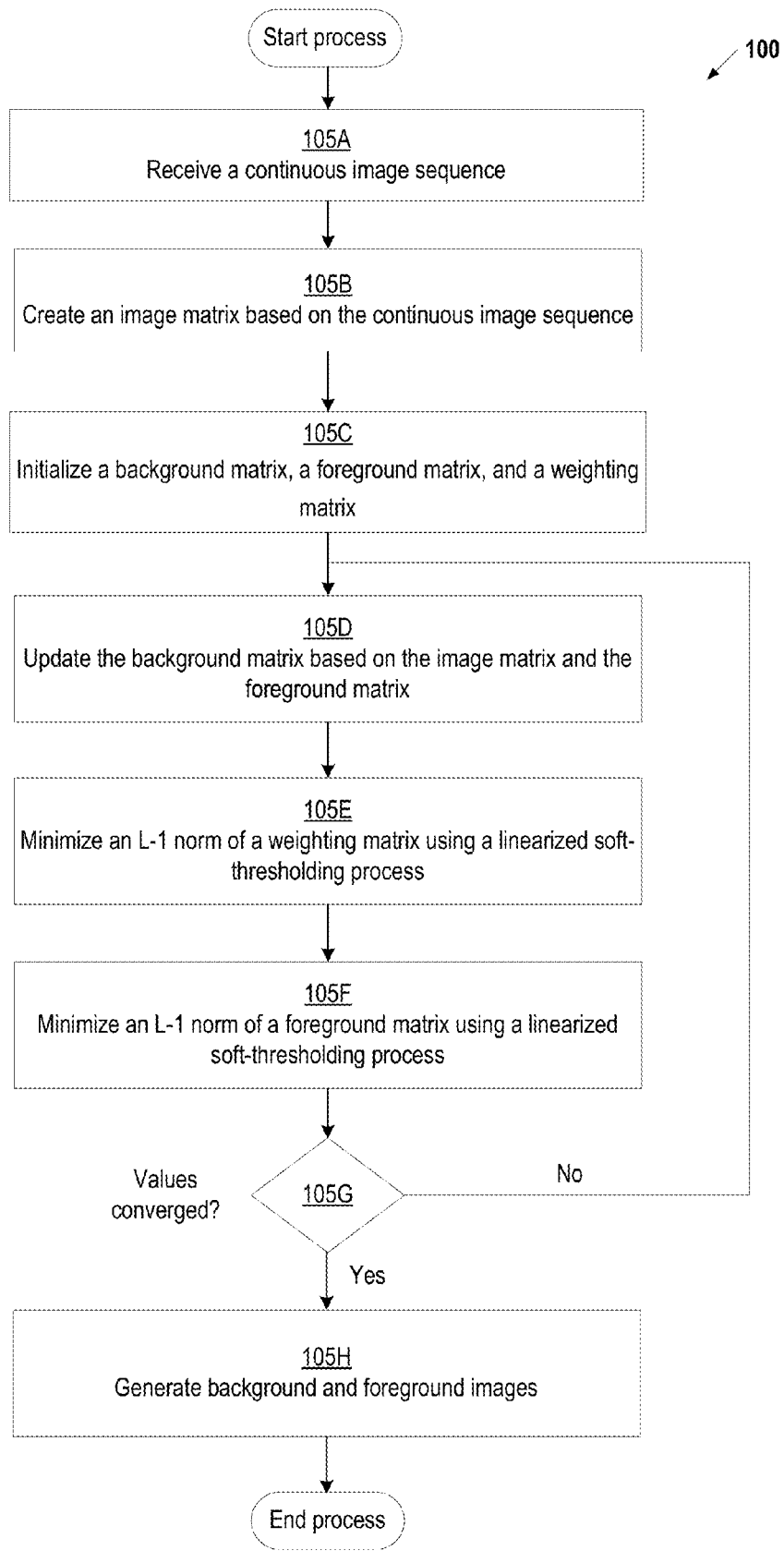
FIG. 1 provides an example implementation of a RoSure-DSP process, according to some embodiments of the present invention.

Systems, methods, and apparatuses are described herein which recover underlying subspaces of data samples from measured data corrupted by general sparse errors. Successful applications of sparse models in computer vision and machine learning imply that in many real-world applications, high dimensional data is distributed in a union of low dimensional subspaces. Nevertheless, the underlying structure may be affected by sparse errors and/or outliers. A dual sparse model is described herein as a framework to analyze this problem, including an algorithm to recover the union of subspaces in presence of sparse corruptions. The techniques described herein may be applied, for example, in computer vision applications such intensity variation segmentation on myocardial perfusion imaging and background subtraction in surveillance video sequences.

A brief summary of notations used throughout this disclosure is as follows. The dimension of m×n matrix X is denoted as dim(X)=(m, n). The notation $\|X\|_0$ denotes the number of nonzero elements in X, while $\|X\|_1$ is the same as the vector $l_1$ norm. For a matrix X and an index set J, we let $X_J$ be the submatrix containing only the columns of indices in J. The notation col(X) denotes the column space of matrix X. The orthogonal projection of matrix X on the support of A is denoted as $P_{\Omega_A}X$, and $P_{\Omega_A^c}=X-P_{\Omega_A}X$. The sparsity of m×n matrix X is denoted by $$\rho(X) = \frac{\|X\|_0}{mn}.$$

In many real-world applications such perfusion imaging, highly dimensional data is distributed in a union of low-dimensional subspaces. The underlying structure of this data may be affected by, for example, sparse errors or outliers in the data. The challenge then is to recover the UoS structure for sparse corruptions of the data. At a high-level, the problem being addressed by techniques described herein is an optimal way to decompose a set of data samples $X=[x_1, x_2 \ldots x_n]$ into a low rank portion L and a sparse portion S. Applying the general concepts of UoS structure recovery, this problem can be restated as determining a partition of X, such that each part $X_I$ can be decomposed into a low dimensional subspace (represented as low rank matrix $L_I$) and a sparse error (represented as a sparse matrix $S_I$) where $$X_I=L_I+S_I; I=1\ldots J$$

Each $L_I$ represents one low dimensional subspace of the original data space, and $L=[L_1|L_2|\ldots|L_J]$ the union of subspaces. Furthermore, the partition would recover the clustering structure of original data samples hidden from the errors $S=[S_1|S_2|\ldots|S_J]$. Concretely, the goal of solving this problem is twofold. First, the correct partition of data may be determined so that data subset resides in a low dimensional subspace. Second, each underlying subspace may be recovered from the corrupted data. In the context of image processing, matrix L contains the background data and the matrix S contains mostly zero columns, with several non-zero ones corresponding to the foreground data.

Consider a data set $l \in R^d$ uniformly sampled from a union of subspaces $S=\cup_{i=1}^{J} S_i$. Assuming sufficient sample density, each sample can be represented by the others from the same subspace with probability 1 (all hyperplanes of a subspace here are of measure 0). Therefore the distribution of samples will span the entire subspace with probability 1. Mathematically, we represent the data matrix by $L=[l_1|l_2|\ldots|l_n]$, yielding L=LW, where W is n×n block-diagonal matrix.

More specifically, if $n_i$ is the number of samples from a subspace $S_i$, and $b_i$ the dimension of block $W_I$ of W, then $n_i \geq b_i$. It follows that $b_i \leq \max_i\{n_i\}$. This condition constrains W to be a sparse matrix, since $$\rho(W) = \frac{\|W\|_0}{n^2} \leq \frac{\max\{n_i\}}{n}.$$

It is worth noting that, to recover the underlying data sampled from the union of spaces, it is equivalent to find a matrix L and W under the above constraints.

The space of W can be defined as a k-block-diagonal matrix. A k-block-diagonal matrix is any n×n matrix M where (i) there exists a permutation matrix P, such that $\tilde{M}=PWP^{-1}$ is a block-diagonal matrix and (ii) the maximum dimension of each block of $\tilde{M}$ is less than or equal to k+1. The space of all such matrices is denoted as $BM_k$.

The space of L can be defined based on $BM_k$ using k-self representative matrices. A k-self-representative matrix is a d×n matrix X with no zero column, where X=XW, $W \in BM_k$, $W_{ii}=0$. The space of all such d×n matrices is denoted by $SR_k$ Consider the case that sample $l_i$ is corrupted by some sparse error $e_i$. Intuitively, we want to separate the sparse errors from the data matrix X and present the remainder in $SR_k$. Using the terminology discussed above, we can state the problem as:

$$\min \|E\|_0$$

$$s.t. X=L+E, L \in SR_k \tag{1}$$

We have some fundamental difficulties in solving this problem on account of the combinatorial nature of $\|\cdot\|_0$ and the complicated geometry of $SR_k$. For the former one, there are established results of using the $l_I$ norm to approximate the sparsity of E. $SR_k$ is challenging because it is a non-convex space and it is not path-connected. Intuitively, it is helpful to consider $L_1, L_2 \in SR_k$ and let $col(L_1) \cap col(L_2) = 0$. Then all possible paths connecting $L_1$ and $L_2$ must pass the origin, given that L is a matrix with no zero columns, and $0 \notin SR_k$. $SR_k$ can hence be divided into at least two components $S_p$ and $SR_k/S_p$.

To avoid solving (1) with a disconnected feasible region, this constraint can be integrated into the objective function. First, a $W_0$-function on a matrix space may be defined where for any d×n matrix X, if there exists $W \in BM_k$, such that $X = XW$, then $W_0(X) = \min_W \|W\|_0$, s.t. $X = XW$, $W_{ii} = 0$, $W \in BM_k$. If such a W does not exist, then $W_0(X) = \infty$.

Then instead of using equation (1), the following optimization problem may be utilized:

$$\min_{L,E} \ W_0(L) + \lambda\|E\|_0 \quad (2)$$
$$\text{s.t.} \ X = L + E$$

The relation of equations (1) and (2) is established by the following lemma: for certain $\lambda$, if $(\hat{L}, \hat{E})$ pair of global optimizer of equation (2), then $(\hat{L}, \hat{E})$ is also a global optimizer of equation (1).

Next, the parsimonious property of $l_I$ norm is leveraged to approximate $\|\cdot\|_0$. First, the definition of $W_0(\cdot)$ is extended to an $l_I$ norm-based function referred to a $W_I$-function on a matrix space. The $W_I$-function on a matrix space is defined as follows: for any d×n matrix X, if there exists $W \in BM_k$, such that $X = XW$, then $W_1(X) = \min_W \|W\|_1$, s.t. $X = XW$, $W_{ii} = 0$, $W \in BM_k$. If such a W does not exist, then $W_1(X) = \infty$. The optimization problem set out in equation (2) can then be reformulated as $$\min \ W_1(L) + 2\lambda\|E\|_1$$
$$\text{s.t.} \ X = L + E \quad (3)$$

Note that equation (3) bears a similar form to the problem of conventional robust PCA. Intuitively, both problems attempt to decompose the data matrix into two parts: one with a parsimonious support, and the other also with a sparse support, however in a different domain. For robust PCA, the parsimonious support of the low rank matrix lies in the singular values. In our case, the sparse support of L lies in the matrix W in the $W_0$ function, meaning that columns of L can be sparsely self-represented.

An important question is when the underlying structure can be exactly recovered by solving equation (3). More specifically, when the solution of $(\hat{L}, \hat{E})$ is exact and when does $\hat{W}$ correctly reflect the true clustering structure. For the former, we establish a sufficient condition of exact decomposition of L and E as follows:

Theorem 1 ($L_0$; E0) can be exactly recovered by solving (3) with $\lambda > 0$, i.e. then $(\hat{L}, \hat{E}) = (L_0; E0)$ if $\forall A$ for same dimension of L, at least one of the following conditions is true:

1. for any partition of $L_0 = [L_1|L_2|\ldots|L_J]$, $|col(L_I)| < k+1$, and $A = [A_1|A_2|\ldots|A_J]$ accordingly, $\exists I$, such that $L_I + A_I$ is full rank.

$$\|P_{\Omega_E^c}A\|_1 - \|P_{\Omega_E}A\|_1 \geq \frac{\|W_0\|_1}{\lambda}.$$

The first condition of Theorem 1 means that the perturbation A on L could lead to a non-feasible point and the second condition states that E is sparse in a way that any feasible move will create a larger component outside the support of E then inside. Intuitively, this theorem states that the space $SR_k$ and E should be nearly "incoherent" to each other, in the sense that any change of $L_o$, i.e. $A = L' - L_o$, will make $E' = E_o - A$ less sparse, and on the other hand, any sparse solution E' will move the corresponding L' off of space $SR_k$.

After having exact L and E, the problem of finding W of $W_I$ given L is equivalent to subspace clustering without outliers. Concretely, this theorem guarantees that if the underlying subspaces are not too "close", and the distribution of points in each subspace is not too skewed, then $w_{ij} \neq 0$ if and only if $l_i$ and $l_j$ are in the same subspace.

Under the conditions stated above, finding $W_I(L)$ can be accomplished by turning the condition $L \in SR_k$ to $W_{ii} = 0$, subsequently modifying $W_I(L)$ into a convex function and making it defined in a connected domain. Specifically, we have $$\hat{W}_1(L) = \min_W \ \|W\|_1, \quad (4)$$
$$\text{s.t.} \ L = LW, W_{ii} = 0$$

Substituting $W_1(L)$ by $\hat{W}_1(L)$ in (3), it allows us to relax the constraints of (3) and directly work on the following problem, $$\min_{W,E} \ \|W\|_1 + \lambda\|E\|_1 \quad (5)$$
$$\text{s.t.} \ X = L + E, L = LW, W_{ii} = 0$$

Other than posing this problem as a recovery and clustering problem, we may also view it from a dictionary learning angle. Note that the constraint $X = L + E$ may be rewritten as $X = LW + E$, to therefore reinterpret the problem of finding L and E as a dictionary learning problem. In addition to the sparse model, atoms in dictionary L are achieved from data samples with sparse variation.

Obtaining an algorithmic solution to (5) is complicated by the bilinear term in constraints which lead to a nonconvex optimization. In some embodiments, the successes of alternating direction method (ADM) and linearized ADM (LADM) m leveraged in a large scale sparse representation problem to focus on designing an appropriate algorithm to approximate the global minimum of (5).

For example, in one embodiment, the solution to equation (5) is performed by a technique based on linearized ADMM and referred to herein as Robust Subspace Recovery via Dual Sparsity Pursuit (RoSure-DSP). Concretely, the sparsity of E and W is pursued alternately until convergence. Besides the effectiveness of ADMM on $l_I$ minimization problems, a more profound rationale for this approach is that the augmented Lagrange multiplier (ALM) method can address the non-convexity of (5). It is understood in the art that, in the context of ALM, the duality gap is zero when a solution exists and the objective function is lower bounded. It hence follows that with a sufficiently large augmented Lagrange multiplier $\mu$ the global optimizer may be approximated by solving the dual problem. Specifically, substituting L by X−E, and using L=LW, we can reduce (5) to a two-variable problem, and hence write the augmented Lagrange function of (5) as follows, $$L(E, W, Y, \mu) = \lambda\|E\|_1 + \|W\|_1 + \qquad (6)$$
$$\langle (X-E)W - (X-E), Y\rangle + \frac{\mu}{2}\|(X-E)W - (X-E)\|_F^2.$$

FIG. 1 provides an example implementation of a RoSure-DSP process 100, according to some embodiments of the present invention. This process 100 may be performed, for example, using an Image Processing Computer such as Computer 215 illustrated in FIG. 2. At 105A, the Image Processing Computer receives a continuous image sequence from an external source (e.g., a medical imaging device, a surveillance computer, etc.). Next, at 105B, an image matrix X is created using the image sequence. For example, each column of the image matrix X may include data from one image in the sequence. Then, at 105C, a background matrix L, a foreground matrix E, and a weighing matrix W are created and set to initialize values (e.g., all zeros).

Continuing with reference to FIG. 1, beginning at 105D, an iterative process is performed to calculate values for the background matrix L, the foreground matrix E, and the weighing matrix W. At 105D, the background matrix L is updated based on the image matrix X and the foreground matrix E. For example, in some embodiments, the foreground matrix E is subtracted from the image matrix X to provide an updated background matrix L. Next, at 105E and 105F, the coefficient matrix W and the foreground matrix E are updated by minimizing an L-1 norm of each respective matrix using linearized soft-thresholding process. Specifically, letting $\tilde{W}=I-W$ in equation (6), the values of W and E may be updated as follows:

$$W_{k+1} = \arg\min_{W} \|W\|_1 + \langle L_{k+1}W - L_{k+1}, Y_k\rangle + \frac{\mu}{2}\|L_{k+1}W - L_{k+1}\|_F^2, \qquad (7)$$

$$E_{k+1} = \arg\min_{E} \lambda\|E\|_1 + \langle -L_{k+1}\hat{W}_{k+1}, Y_k\rangle + \frac{\mu}{2}\|L_{k+1}\hat{W}_{k+1}\|_F^2. \qquad (8)$$

The solution of (7) and (8) is approximated in each iteration by linearizing the augmented Lagrange term, $$W_{k+1} = \mathcal{T}_{\frac{1}{\mu\eta_1}}\left(W_k + \frac{L_{k+1}^T(L_{k+1}\hat{W}_k - Y_k/\mu_k)}{\eta_1}\right), \qquad (9)$$

$$E_{k+1} = \mathcal{T}_{\frac{1}{\mu\eta_2}}\left(E_k + \frac{(L_{k+1}\hat{W}_{k+1} - Y_k/\mu_k)\hat{W}_{k+1}^T}{\eta_2}\right), \qquad (10)$$

where $\eta_1 \geq \|L\|_2^2$, $\eta_2 \geq \|W\|_2^2$, and $\mathcal{T}_\alpha(\bullet)$ is soft-thresholding operator. In some embodiments, the process 100 includes an additional step (not shown in FIG. 3) where the, the Lagrange multipliers are updated as follows, $$Y_{k+1} = Y_k + \mu_k(L_{k+1}W_{K+1} - L_{k+1}) \qquad (11)$$

$$\mu_{k+1} = \rho\mu_k \qquad (12)$$

Steps 105D-105E are repeated for a plurality of iterations. Following each iteration, at 105G, the values of the background matrix L, the foreground matrix E, and/or the weighing matrix W are compared to those calculated in previous iterations to determine whether values have converged. If they have not, the process is repeated at 105D. However, if the values have converged, at 105H, the process concludes where the background matrix L and the foreground matrix E are used to generate background and foreground images, respectively.

Figure 2:
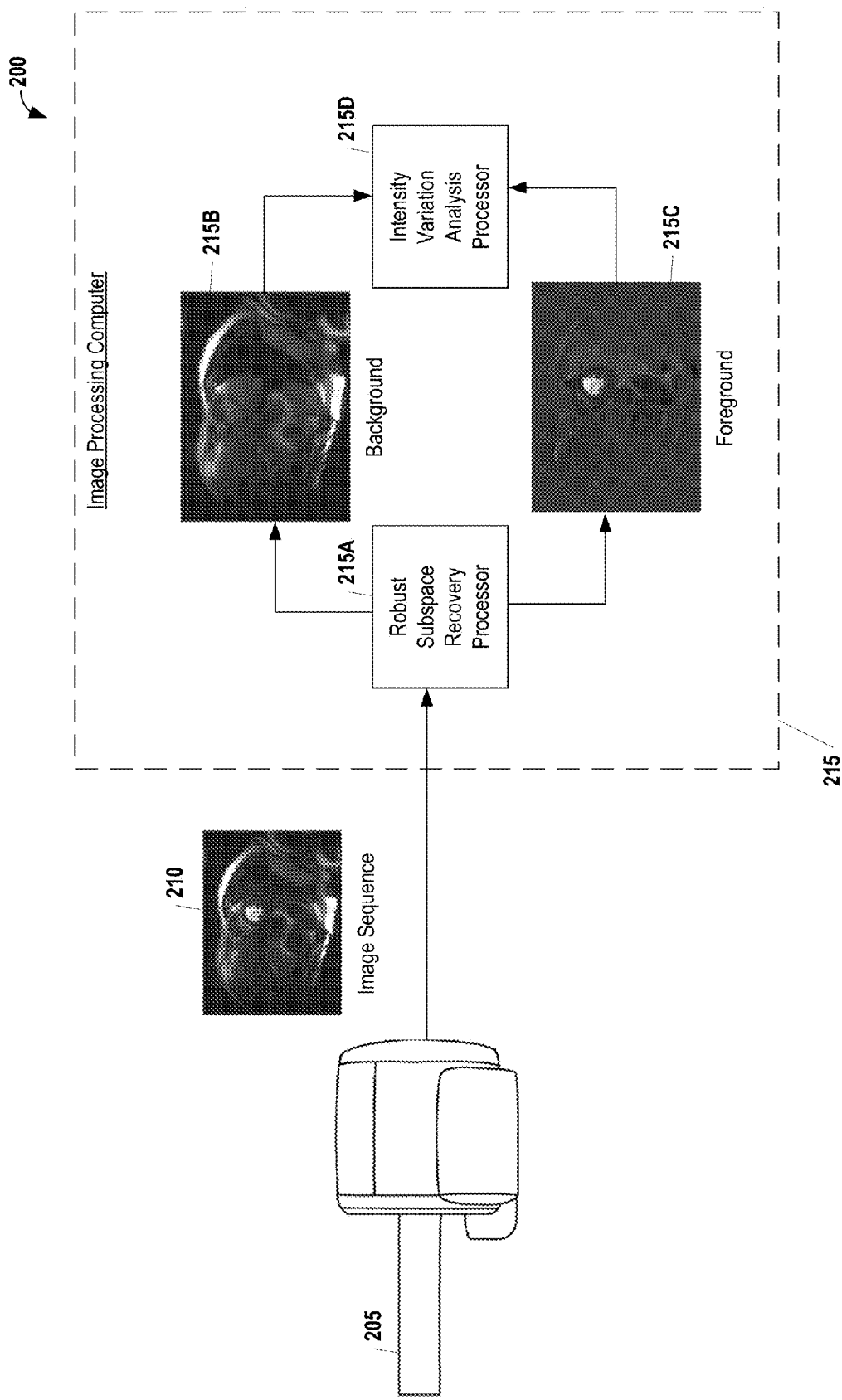
FIG. 2 provides an example of a system for performing robust subspace recovery via dual sparsity pursuit, according to some embodiments of the present invention.

FIG. 2 provides an example of a system 200 for performing robust subspace recovery via dual sparsity pursuit, according to some embodiments of the present invention. In this example, robust subspace recovery is applied to perform intensity variation segmentation in myocardial perfusion imaging applications. As is well understood in the art, the intensity variation in myocardial perfusion imaging plays an important role in coronary artery diseases. It is often necessary to correct the cardiac motion and to register the image sequence to acquire accurate intensity changes. Nevertheless, the intensity variation itself may also affect the performance of registration. Therefore, the decomposition of motion and intensity change of myocardial perfusion imaging may potentially enhance the registration performance and hence the measurement of intensity variation. The periodic feature of cardiac motion and the relatively sparse support of the intensity change are ideally adapted to the techniques described herein.

As is well understood in the art, perfusion imaging is performed by first injecting a contrast agent intravenously into a patient. An imaging device such as a Magnetic Resonance Imaging device is then used to acquire an image sequence of a volume of interest showing distribution of the contrast agent through the volume. The acquired image sequence is processed to determine the changes in the image intensities over time. These changes are then evaluated to determine whether there are any abnormal changes in signal intensities which could represent a perfusion defect (e.g., cardiac infarction) in the volume of interest.

Continuing with reference to FIG. 2, following injection of a contrast agent into a patient's bloodstream, Imaging Device 205 is used to acquire a sequence of images 210 of the patient's heart over multiple cardiac cycles. In the example of FIG. 2, the Imaging Device 205 is illustrated as a Magnetic Resonance Device. However, other imaging devices may similarly be used in other embodiments of the present invention. The image sequence 210 is received by Image Processing Computer 215. A Robust Subspace Recovery Processor 215A in the Image Processing Computer 215 executes an algorithm (described in greater detail below) which separates the image sequence 210 into a foreground portion 215C and a background portion 215B. Within the context of perfusion analysis the foreground portion includes the contrast agent moving through the imaged volume. The respective intensity values of the foreground portion 215C and the background portion 215B are then evaluated by the Intensity Variation Analysis Processor 215D to determine any abnormalities in the imaged volume. For example, in cardiac applications, one or more of the foreground portion 215C and the background portion 215B may be used to identify any infarcted areas of the anatomical area.

Figure 3:
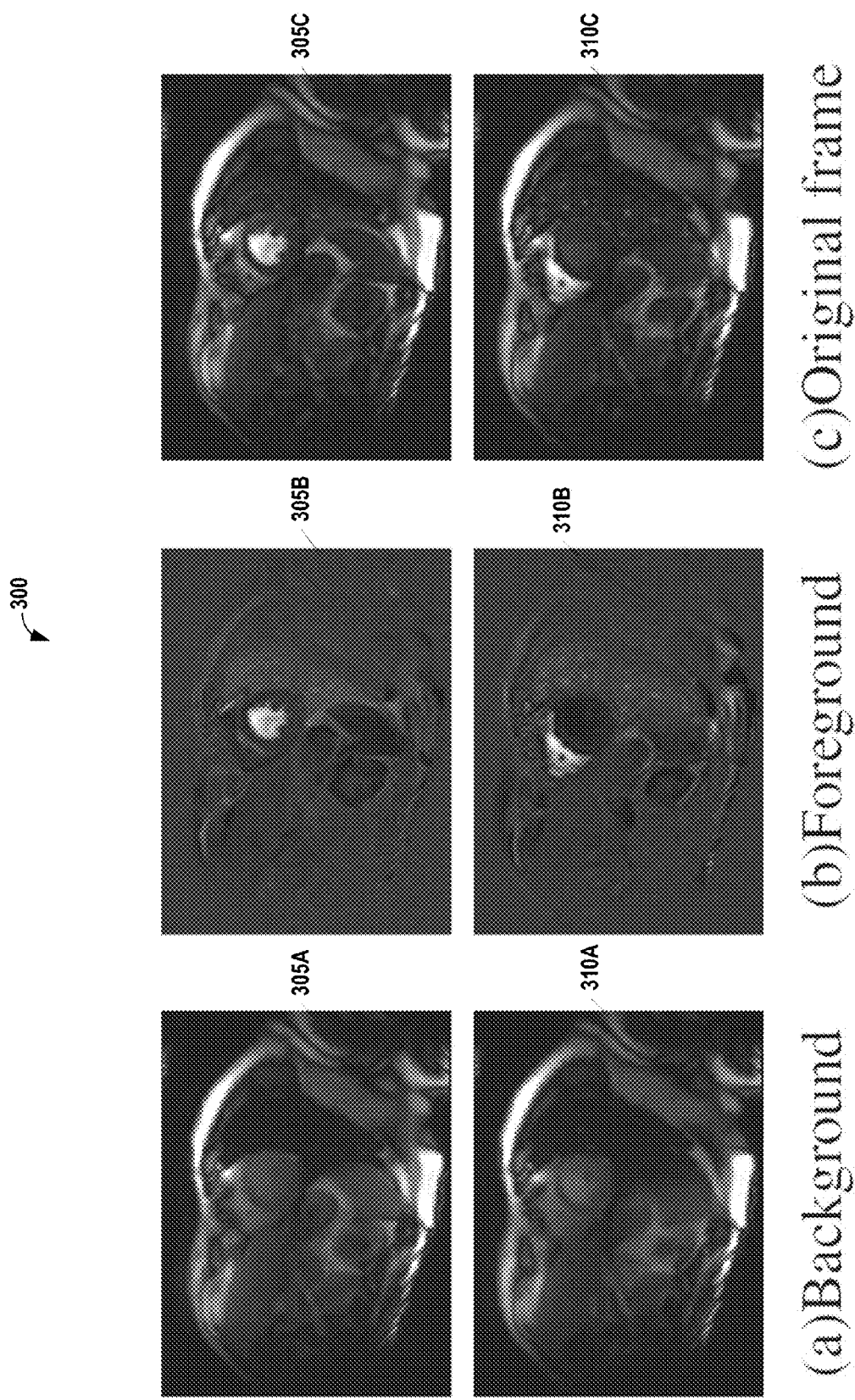
FIG. 3 provides a set of sample frames of intensity variation segmentation of myocardial perfusion image sequences, according to some embodiments of the present invention.

FIG. 3 provides a set 300 of sample frames of intensity variation segmentation of myocardial perfusion image sequences, according to some embodiments of the present invention. Images 305A and 305B show the background and foreground, respectively extracted by applying the robust subspace recovery algorithm described herein to the original image frame shown in image 305C. Note that images 305A, 305B, and 305C are larger versions of the images presented in FIG. 1, presented here to provide additional detail. Image 310A, 310B, and 310C shown the background, foreground, and original frame, respectively, for a different example in which robust subspace recovery is used.

Figure 4:
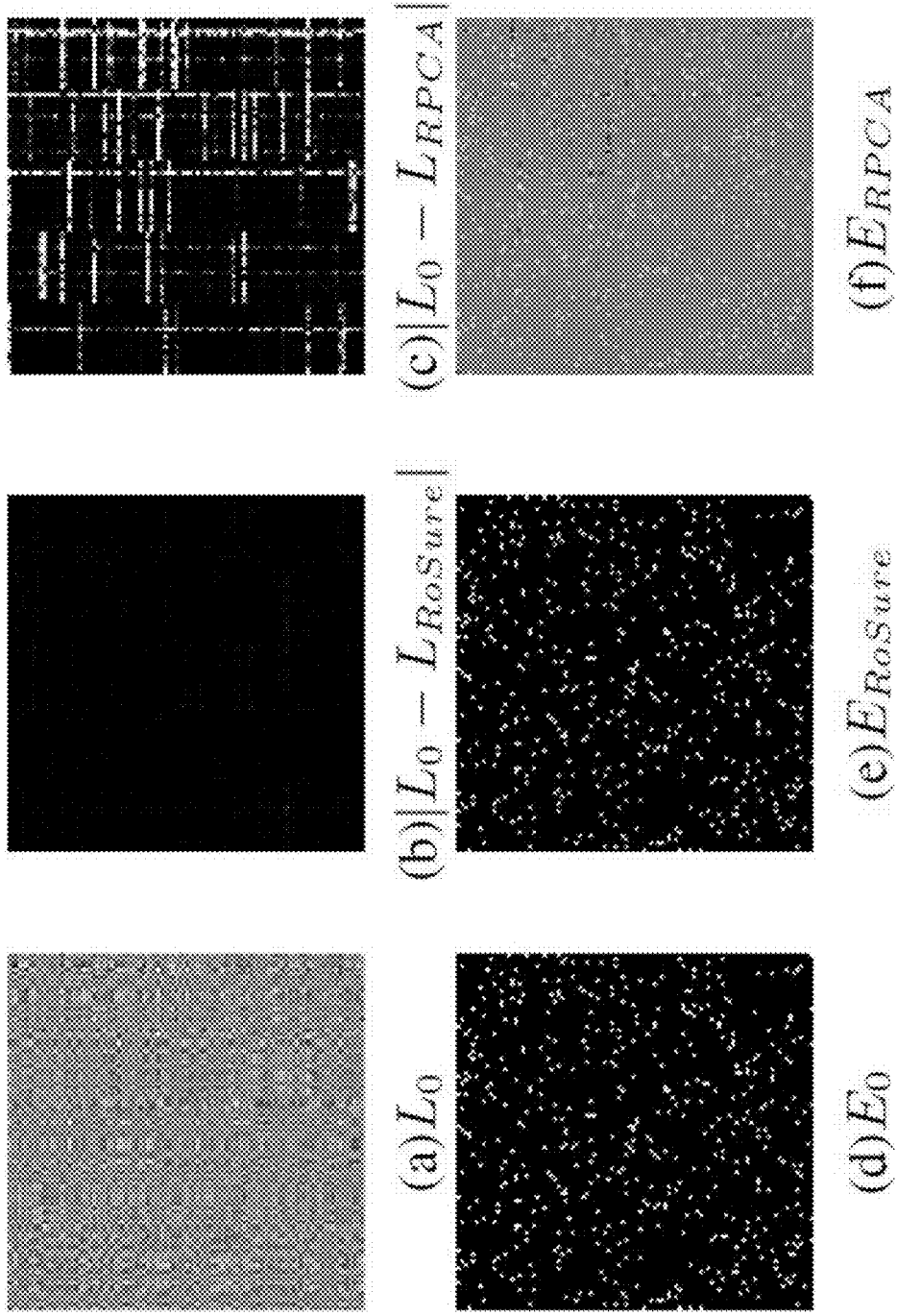
FIG. 4 provides an example of subspace exact recovery, according to some embodiments of the present invention, in comparison with robust PCA.
Figure 5:
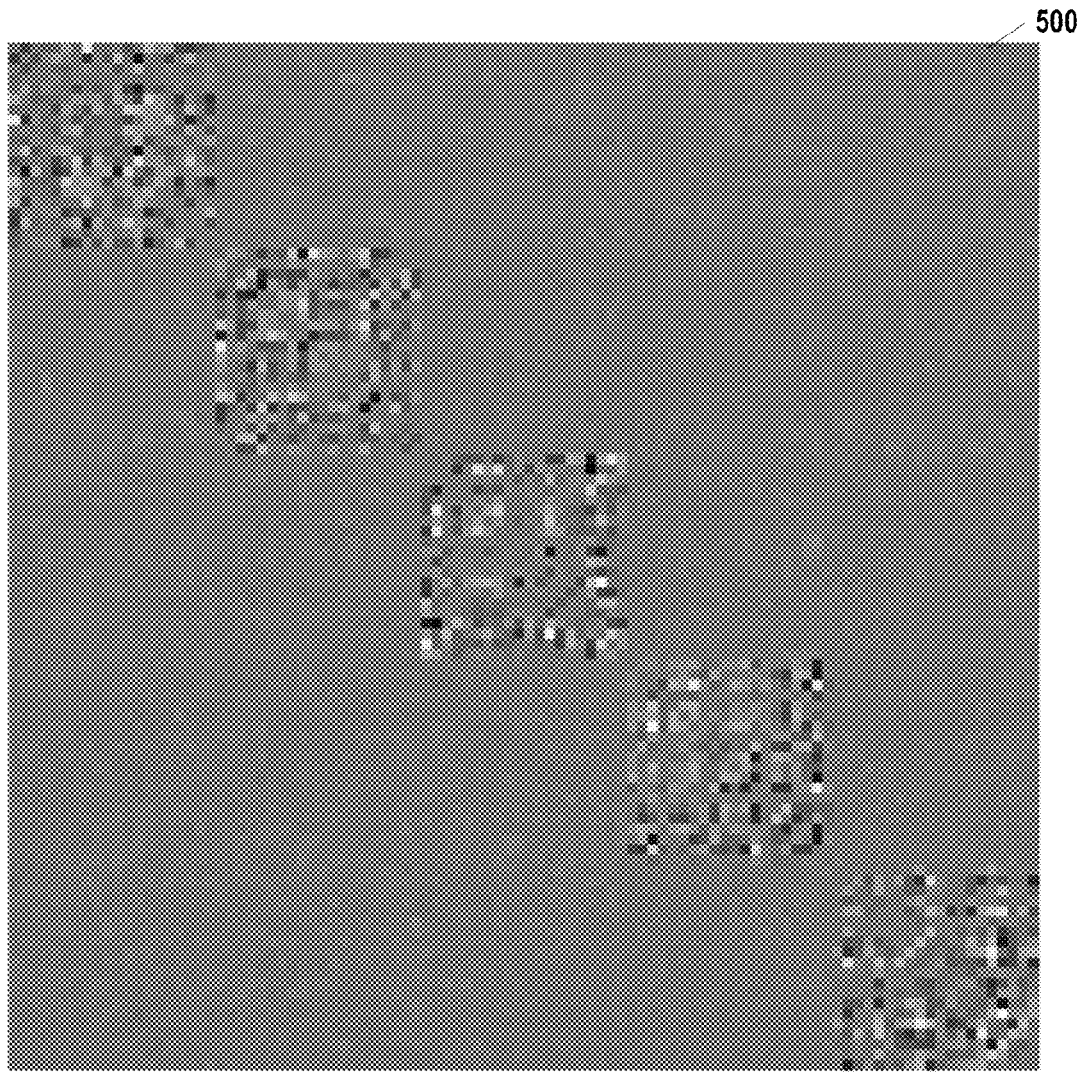
FIG. 5 provides an illustration of the sparse coefficient matrix W, as may be used in some embodiments of the present invention.

FIG. 4 provides an example of subspace exact recovery, according to some embodiments of the present invention, in comparison with robust Principal Component Analysis (PCA). The data matrix is fixed to be a 200×200 matrix, and all data points are sampled from a union of 5 subspaces. Note that ($L_{RoSure}$, $E_{RoSure}$) and ($L_0$, $E_0$) are almost identical. FIG. 5 provides an illustration 500 of the sparse coefficient matrix W, as may be used in some embodiments of the present invention. In FIG. 5, one can observe that $W_{RoSure}$ shows clear clustering properties such that $w_{ij} \approx 0$, when $l_i$, $l_j$ are not in the same subspace.

Figure 6:
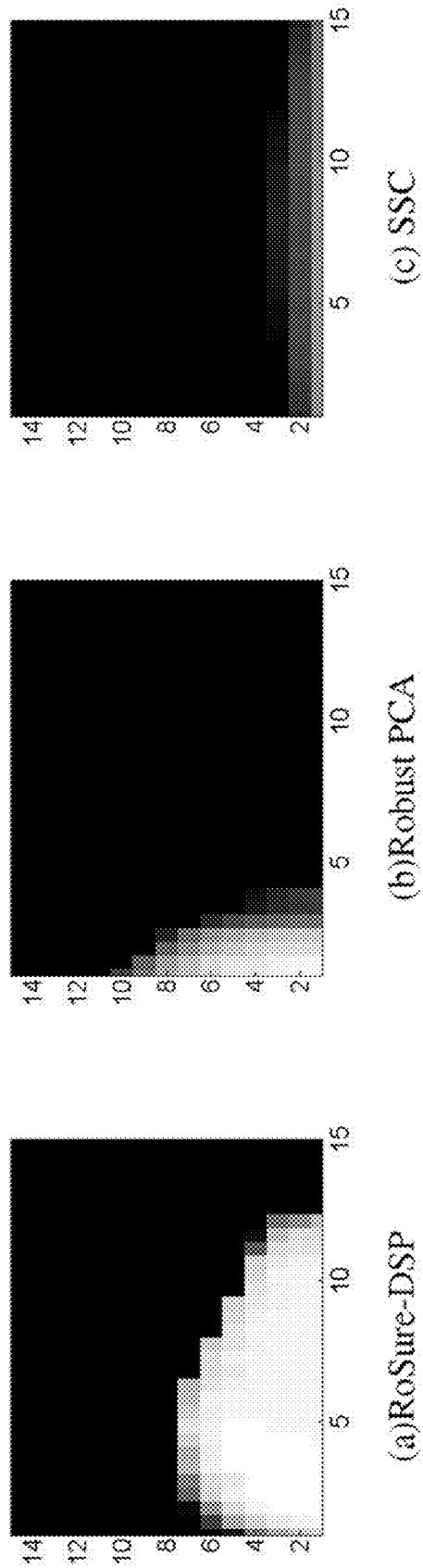
FIG. 6 is the overall recovery results of RoSure-DSP, it may be implemented in various embodiments of the present invention in comparison with robust PCA and another conventional technique, Sparse Subspace Clustering ("SSC")

FIG. 6 is the overall recovery results of RoSure-DSP, it may be implemented in various embodiments of the present invention in comparison with robust PCA and another conventional technique, Sparse Subspace Clustering ("SSC"). White shaded areas indicate a lower error and hence amount to exact recovery. The dimension of each subspace is varied from 1 to 15, and the sparsity of S from 0.5% to 15%. Each submatrix $L_I = X_I Y_I^T$ with n×d matrices $X_I$ and $Y_I$, are independently sampled from an i.i.d normal distribution. The recovery error is measured as $err(L) = \|L_o - \hat{L}\|_F / \|L_o\|_F$. A significant larger range of RoSure-DSP may be observed compared to robust PCA and SSC. The differences between RoSure-DSP and robust PCA are due to the difference of data models. Concretely, when the sum of the dimension of each subspace is small, the UoS model degenerates to a "low-rank+sparse" model, which suits robust PCA very well. On the other hand, when the dimension of each subspace increases, the overall rank of L tends to be accordingly larger and hence the low rank model may not hold anymore. Since RoSure-DSP is designed to fit UoS model, it can recover the data structure in a wider range. For SSC, this method specifically fits the condition when only a small portion of data includes outliers. Under the assumption that most of the data is corrupted, it is hence very difficult to reconstruct samples by other corrupted ones.

The techniques described herein may also be extended to address many computer vision and machine learning problems. For example, FIGS. 7A and 7B demonstrate how the techniques may be applied to video background subtraction applications, according to some embodiments of the present invention. Surveillance videos can be naturally modeled as an UoS model due to their relatively static background and sparse foreground. The power of the UoS model described herein lies in coping with both a static camera and a panning one with periodic motion. FIG. 7A shows the segmentation results with a static background for two images. The first row of images in FIG. 7A includes background and foreground images for an original image frame. The second row includes background and foreground images for a different image frame. For the scenario of a "panning camera", a sequence was generated by cropping the previous video. The cropped region is swept from bottom right to top left and then backward periodically, at the speed of 5 pixels per frame. The results for a moving camera are shown in FIG. 7B. Again, each row shows the background and foreground results for a distinct image. One may observe that the results in the moving camera scenario are only slightly worse than the static case.

Figure 8:
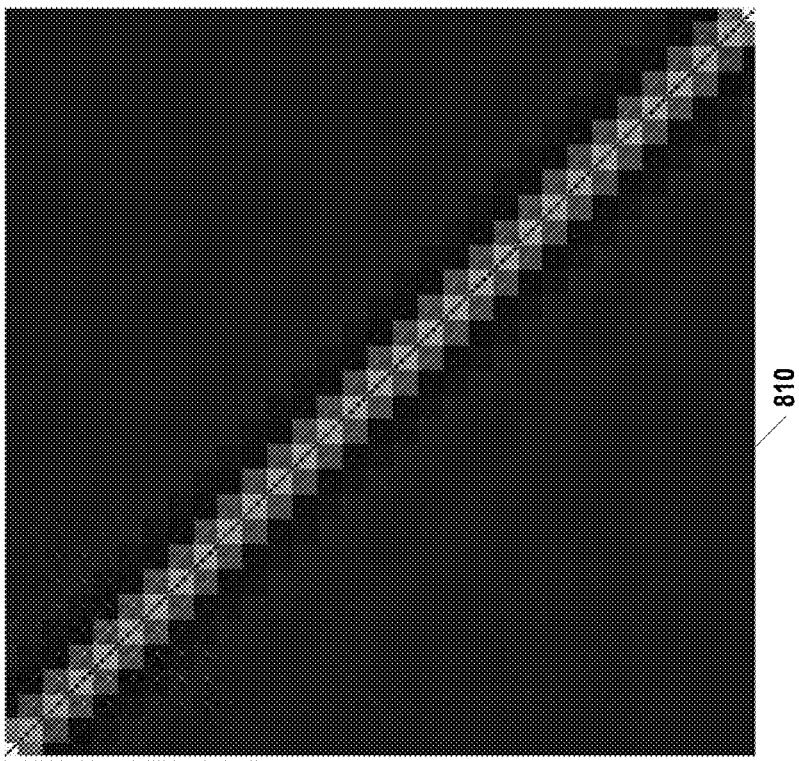
FIG. 8 provides two images of the sparse coefficient matrix W, as may be used in background subtraction applications such as those illustrated in FIGS. 7A and 7B
Figure 8:
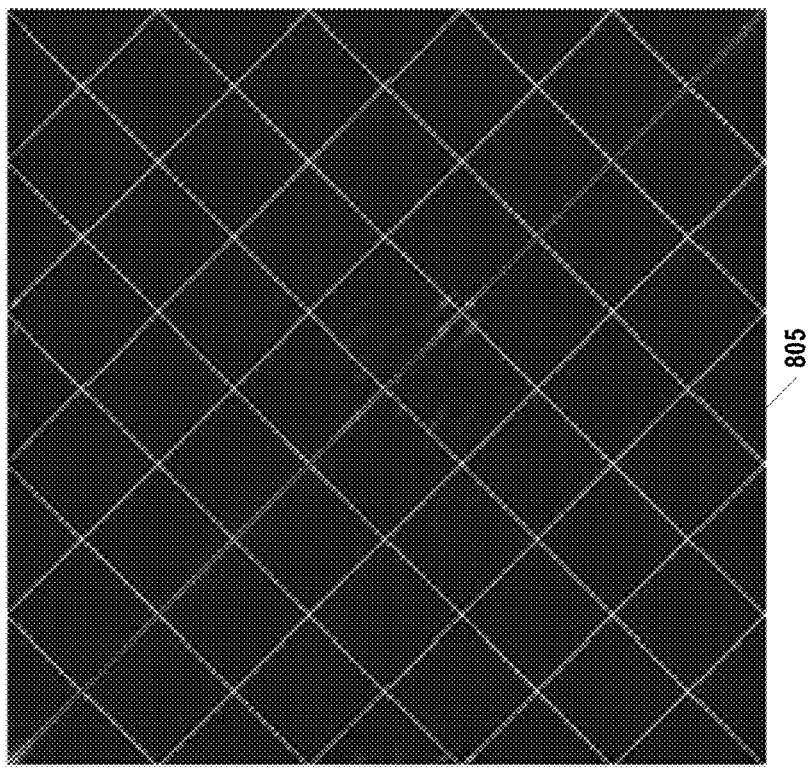

FIG. 8 provides two images of the sparse coefficient matrix W, as may be used in background subtraction applications such as those illustrated in FIGS. 7A and 7B. Specifically, image 805 shows matrix W without rearrangement according to the position of the camera, while image 810 shows matrix W with rearrangement according to the position of the camera Interestingly, matrix W provides important information about the relations among data points, which potentially may be used to cluster data into individual clusters. In image 805 we can see that, for each column of the coefficient matrix W, the nonzero entries appear periodically. In considering the periodic motion of the camera, every frame may be analyzed as mainly represented by the frames when the camera is in a similar position, i.e. a similar background, with the foreground moving objects as outliers. Hence, one may permute the rows and columns of W according to the position of cameras, as shown in image 810. A block-diagonal structure then emerges, where images with similar backgrounds are clustered as one subspace.

Figure 9A:
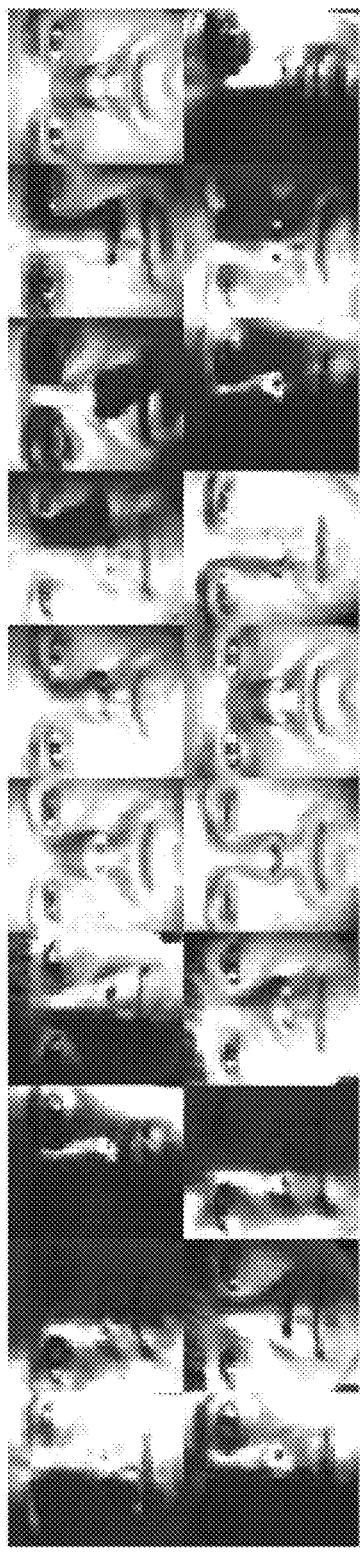
FIG. 9A shows a set of sample face images in the Extended Yale Face Database B.
Figure 9B:
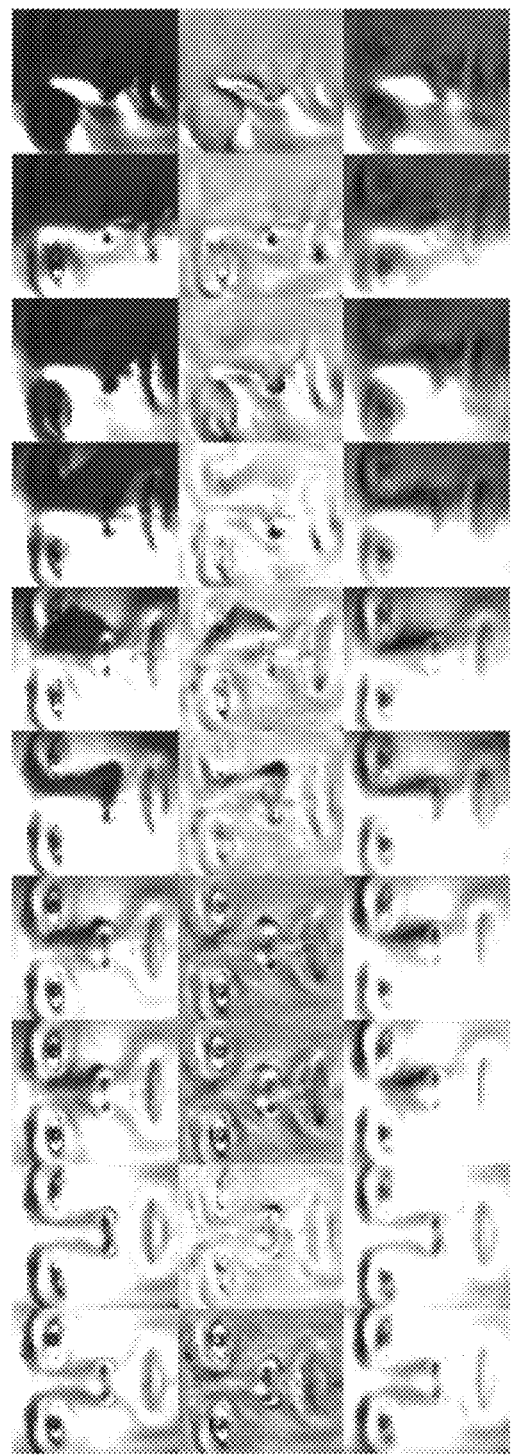
FIG. 9B provides an illustration of recovery results of human face images, according to some embodiments of the present invention.

Recent research on sparse models implies that a parsimonious representation may be a key factor for classification. Indeed, the sparse coefficients pursued by the technique described herein show clustering features in experiments of both synthetic and real-world data. FIG. 9A shows a set 905 of sample face images in the Extended Yale Face Database B. The database includes cropped face images of 38 different people under various illumination conditions. Images of each person may be seen as data points from one subspace, albeit heavily corrupted by entries due to different illumination conditions, as shown in FIG. 9A. In an experiment of the techniques described herein, each image is downsampled to 48×42 and is vectorized to a 2016-dimensional vector. In addition, the sparse coefficient matrix W from RoSure-DSP is used to formulate an affinity matrix as $A = \tilde{W} + \tilde{W}^T$, where $\tilde{W}$ is a thresholded version of W. A spectral clustering method is utilized to determine the clusters of data, with affinity matrix A as the input. FIG. 9B provides a set 910 of recovery results of human face images, according to some embodiments of the present invention. The three rows from top to bottom are original images, the components E, and the recovered images, respectively. In most cases, the sparse term E compensates for the information missing caused by lightning condition. This is especially true when the shadow area is small. Thus, for a sparser support of error term E, we can see a visually perfect recovery of the missing area. This result validates the effectiveness of the technique described herein to solve the problem of subspace clustering with sparsely corrupted data.

Figure 10:
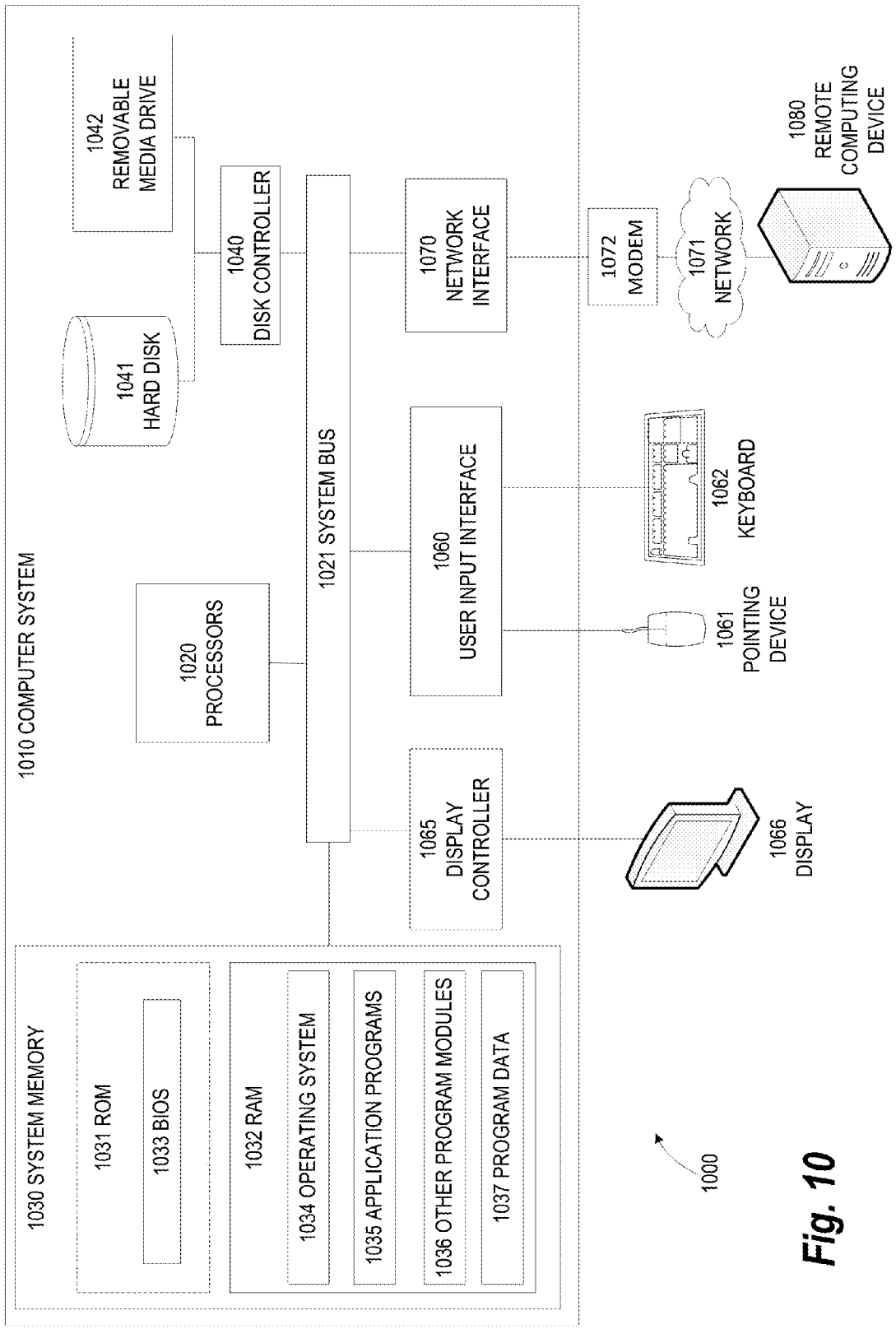
FIG. 10 illustrates an exemplary computing environment within which embodiments of the invention may be implemented.

FIG. 10 illustrates an exemplary computing environment 1000 within which embodiments of the invention may be implemented. For example, computing environment 1000 may be used to implement one or more components of system 200 shown in FIG. 2. Computers and computing environments, such as computer system 1010 and computing environment 1000, are known to those of skill in the art and thus are described briefly here.

As shown in FIG. 10, the computer system 1010 may include a communication mechanism such as a system bus 1021 or other communication mechanism for communicating information within the computer system 1010. The computer system 1010 further includes one or more processors 1020 coupled with the system bus 1021 for processing the information.

The processors 1020 may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Continuing with reference to FIG. 10, the computer system 1010 also includes a system memory 1030 coupled to the system bus 1021 for storing information and instructions to be executed by processors 1020. The system memory 1030 may include computer readable storage media in the form of volatile and/or nonvolatile memory, such as read only memory (ROM) 1031 and/or random access memory (RAM) 1032. The RAM 1032 may include other dynamic storage device(s) (e.g., dynamic RAM, static RAM, and synchronous DRAM). The ROM 1031 may include other static storage device(s) (e.g., programmable ROM, erasable PROM, and electrically erasable PROM). In addition, the system memory 1030 may be used for storing temporary variables or other intermediate information during the execution of instructions by the processors 1020. A basic input/output system 1033 (BIOS) containing the basic routines that help to transfer information between elements within computer system 1010, such as during start-up, may be stored in the ROM 1031. RAM 1032 may contain data and/or program modules that are immediately accessible to and/or presently being operated on by the processors 1020. System memory 1030 may additionally include, for example, operating system 1034, application programs 1035, other program modules 1036 and program data 1037.

The computer system 1010 also includes a disk controller 1040 coupled to the system bus 1021 to control one or more storage devices for storing information and instructions, such as a magnetic hard disk 1041 and a removable media drive 1042 (e.g., floppy disk drive, compact disc drive, tape drive, and/or solid state drive). Storage devices may be added to the computer system 1010 using an appropriate device interface (e.g., a small computer system interface (SCSI), integrated device electronics (IDE), Universal Serial Bus (USB), or FireWire).

The computer system 1010 may also include a display controller 1065 coupled to the system bus 1021 to control a display or monitor 1066, such as a cathode ray tube (CRT) or liquid crystal display (LCD), for displaying information to a computer user. The computer system includes an input interface 1060 and one or more input devices, such as a keyboard 1062 and a pointing device 1061, for interacting with a computer user and providing information to the processors 1020. The pointing device 1061, for example, may be a mouse, a light pen, a trackball, or a pointing stick for communicating direction information and command selections to the processors 1020 and for controlling cursor movement on the display 1066. The display 1066 may provide a touch screen interface which allows input to supplement or replace the communication of direction information and command selections by the pointing device 1061.

The computer system 1010 may perform a portion or all of the processing steps of embodiments of the invention in response to the processors 1020 executing one or more sequences of one or more instructions contained in a memory, such as the system memory 1030. Such instructions may be read into the system memory 1030 from another computer readable medium, such as a magnetic hard disk 1041 or a removable media drive 1042. The magnetic hard disk 1041 may contain one or more datastores and data files used by embodiments of the present invention. Datastore contents and data files may be encrypted to improve security. The processors 1020 may also be employed in a multi-processing arrangement to execute the one or more sequences of instructions contained in system memory 1030. In alternative embodiments, hard-wired circuitry may be used in place of or in combination with software instructions. Thus, embodiments are not limited to any specific combination of hardware circuitry and software.

As stated above, the computer system 1010 may include at least one computer readable medium or memory for holding instructions programmed according to embodiments of the invention and for containing data structures, tables, records, or other data described herein. The term "computer readable medium" as used herein refers to any medium that participates in providing instructions to the processors 1020 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 1041 or removable media drive 1042. Non-limiting examples of volatile media include dynamic memory, such as system memory 1030. Non-limiting examples of transmission media include coaxial cables, copper wire, and fiber optics, including the wires that make up the system bus 1021. Transmission media may also take the form of acoustic or light waves, such as those generated during radio wave and infrared data communications.

The computing environment 1000 may further include the computer system 1010 operating in a networked environment using logical connections to one or more remote computers, such as remote computing device 1080. Remote computing device 1080 may be a personal computer (laptop or desktop), a mobile device, a server, a router, a network PC, a peer device or other common network node, and typically includes many or all of the elements described above relative to computer system 1010. When used in a networking environment, computer system 1010 may include modem 1072 for establishing communications over a network 1071, such as the Internet. Modem 1072 may be connected to system bus 1021 via user network interface 1070, or via another appropriate mechanism.

Network 1071 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 1010 and other computers (e.g., remote computing device 1080). The network 1071 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 1071.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

We claim:

1. A computer-implemented method of detecting a foreground data in an image sequence using a dual sparse model framework, the method comprising:
    creating an image matrix based on a continuous image sequence;
    initializing a background matrix, a foreground matrix, and a coefficient matrix;
    performing a subspace recovery process over a plurality of iterations until convergence of one or more of the background matrix, the foreground matrix, and the coefficient matrix over the plurality of iterations, the subspace recovery process comprising:
        updating the background matrix based on the image matrix and the foreground matrix,
        updating the coefficient matrix by minimizing an L–1 norm of the coefficient matrix using a first linearized soft-thresholding process, and
        updating the foreground matrix by minimizing an L–1 norm of the foreground matrix using a second linearized soft-thresholding process;
    generating one or more background images based on the background matrix; and
    generating one or more foreground images based on the foreground matrix.

2. The method of claim 1, wherein the subspace recovery process utilizes one or more tuning parameters.

3. The method of claim 2, wherein tuning parameters are applied by the first linearized soft-thresholding process and the second linearized soft-thresholding process.

4. The method of claim 3, wherein the subspace recovery process further comprises:
    updating the tuning parameters during each of the plurality of iterations.

5. The method of claim 4, wherein the tuning parameters comprise one or more Lagrange multiplier values.

6. The method of claim 1, further comprising:
    generating a foreground image sequence based on the one or more foreground images; and
    generating a background image sequence based on the one or more background images.

7. The method of claim 6, wherein
    the background image sequence depicts a lymphatic system or a blood vessel; and
    the foreground image sequence depicts a passage of fluid through the lymphatic system or the blood vessel to an organ or tissue.

8. The method of claim 7, further comprising:
    using the foreground image sequence to generate a measurement of intensity variation.

9. A computer-implemented method of performing intensity variation segmentation using a dual sparse model framework, the method comprising:
    receiving a myocardial perfusion image sequence comprising a plurality of images depicting fluid passing through a cardiac structure over time;
    creating an image matrix based on a continuous image sequence;
    initializing a background matrix, a foreground matrix, and a coefficient matrix;
    performing a subspace recovery process over a plurality of iterations until convergence of one or more of the background matrix, the foreground matrix, and the coefficient matrix over the plurality of iterations, the subspace recovery process comprising:
        updating the background matrix based on the image matrix and the foreground matrix,
        updating the coefficient matrix by minimizing an L–1 norm of the coefficient matrix using a first linearized soft-thresholding process, and
        updating the foreground matrix by minimizing an L–1 norm of the foreground matrix using a second linearized soft-thresholding process; and
    using the foreground matrix to generate a measurement of intensity variation across the myocardial perfusion image sequence.

10. The method of claim 9, further comprising:
    generating a sequence of images depicting motion of the cardiac structure over time based on the background matrix.

11. The method of claim 9, wherein the subspace recovery process utilizes one or more tuning parameters.

12. The method of claim 11, wherein tuning parameters are applied by the first linearized soft-thresholding process and the second linearized soft-thresholding process.

13. The method of claim 12, wherein the tuning parameters comprise one or more Lagrange multiplier values.

14. The method of claim 11, wherein the subspace recovery process further comprises:
    updating the one or more tuning parameters during each of the plurality of iterations.

15. An article of manufacture for detecting a foreground data in an image sequence using a dual sparse model framework, the article of manufacture comprising a non-transitory, tangible computer-readable medium holding computer-executable instructions for performing a method comprising:
    creating an image matrix based on a continuous image sequence;
    initializing a background matrix, a foreground matrix, and a coefficient matrix;
    performing a subspace recovery process over a plurality of iterations until convergence of one or more of the background matrix, the foreground matrix, and the coefficient matrix over the plurality of iterations, the subspace recovery process comprising:
        update the background matrix based on the image matrix and the foreground matrix,
        update the coefficient matrix by minimizing an L−1 norm of the coefficient matrix using a first linearized soft-thresholding process, and
        update the foreground matrix by minimizing an L−1 norm of the foreground matrix using a second linearized soft-thresholding process;
    generating one or more background images based on the background matrix; and
    generating one or more foreground images based on the foreground matrix.

16. The article of manufacture of claim 15, wherein the method further comprises:
    generating a foreground image sequence based on the one or more foreground images; and
    generating a background image sequence based on the one or more background images.

17. The article of manufacture of claim 16, wherein
    the background image sequence depicts a lymphatic system or a blood vessel; and
    the foreground image sequence depicts a passage of fluid through the lymphatic system or the blood vessel to an organ or tissue.

18. The article of manufacture of claim 17, wherein the method further comprises:
    using the foreground image sequence to generate a measurement of intensity variation.

* * * * *